US006411417B1

(12) United States Patent
Roberts et al.

(10) Patent No.: US 6,411,417 B1
(45) Date of Patent: Jun. 25, 2002

(54) OPTICAL EQUALIZER

(75) Inventors: Kim Bryon Roberts, Nepean (CA); Simon Paul Parry, Bishop's Stortford; Alan Robinson, Harlow, both of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/158,684

(22) Filed: Sep. 22, 1998

(51) Int. Cl.$^7$ ................................................ H04B 10/00
(52) U.S. Cl. ..................... 359/161; 359/124; 359/177; 385/24
(58) Field of Search ................... 359/124, 161, 359/187, 174, 179, 188, 195, 173, 341, 177, 176; 385/24

(56) References Cited

U.S. PATENT DOCUMENTS

| | | | |
|---|---|---|---|
| 5,276,543 A | 1/1994 | Olshansky | 359/124 |
| 5,513,029 A | 4/1996 | Roberts | 359/177 |
| 5,596,661 A | * 1/1997 | Henry et al. | 385/24 |
| 5,956,437 A | * 9/1999 | Day et al. | 385/2 |
| 6,104,492 A | * 8/2000 | Giles et al. | 356/346 |
| 6,175,671 B1 | * 1/2001 | Roberts | 385/14 |
| 6,222,655 B1 | * 4/2001 | Terahara | 359/124 |

OTHER PUBLICATIONS

Experimental Demonstration of Dynamic Network Equalization of Three 2.5–Gb/s WDM Channels over 1000km Using Acoustooptic Tunable Filters S. H. Huang et al, IEEE Photonics Technolgoy Letters, vol. 8, No. 9, Sep. 1996, pp. 1243–5.

Crosstalk Reduction in a 10–GHz Spacing Arrayed–Waveguide GRating by Phase–Error Compensation, Hiroaki Yamada, Kazumasa Takada, Journal of Lightwave Technology, vol. 16, No. 3, Mar. 1998 p364–371.

10GHz–spaced arrayed–waveguide grating multiplexer with phase–error–compensating thin–film heaters, H. Yamada et al, Electronic Letters, Mar. 2, 1995, vol. 31, No. 5, p360–361.

Measurement of phase error distributions in silica–based arrayed–waveguide grating multiplexers by using Foureer transform spectroscopy, Takada et al, Electronics Letters, Sep. 29, 1994, vol. 30, No. 20, p1671–1672.

Digital Signal Processing, A. V. Oppenheim/R.W. Schafer, Chapter 7, p337–375, 1975.

Tunable Coherent Optical Transversal EDFA Gain Equalization, F. Khaleghi, et al, Journal of Lightwave Technology, vol. 13, No. 4, Apr. 1995, pp. 581 to 587.

\* cited by examiner

*Primary Examiner*—Thomas Mullen
(74) *Attorney, Agent, or Firm*—Lee, Mann, Smith, McWilliams, Sweeney & Ohlson

(57) ABSTRACT

An optical equalizer for a wavelength division multiplexed optical signal in an optical communications system utilises an array of parallel waveguides using planar waveguide technology. Waveguides having a range of different lengths have transmission controlled respectively in amplitude and/ or phase in accordance with parameters calculated from a Fourier transform of an input frequency characteristic. Calculation of the parameters may be simplified by a Hilbert transform applied to determine phase values of the input terms of the Fourier transform. Feedback may be utilized by measuring the equalizer output and generating difference signals applied to the input to improve accuracy of equalization response by iteration or to overcome systematic errors. The equalizer has application to optical systems having line amplifiers where fiber amplifiers result in gain tilt, the equalizer allowing gain tilt to be corrected.

42 Claims, 14 Drawing Sheets

EFFECT OF SIMPLE TWO ARM MACH ZEHNDER INTERFEROMETER

EFFECT OF MULTIPLE ARM MACH ZEHNDER
INTERFEROMETER – PARALLEL WAVEGUIDE ARRAY FOR
FREQUENCY RESPONSE SYNTHESIS

RESULT OF SIMULATION OF THE OPTICAL EQUALIZER FOR A RANDOMLY GENERATED TARGET FREQUENCY CHARACTERISTIC

OPTICAL EQUALIZER

This invention relates to the equalisation of optical signals in an optical communications system and in particular but not exclusively to the equalisation of wavelength division multiplexed optical signals.

BACKGROUND TO THE INVENTION

The control of optical power levels in optical communications systems is critical in obtaining optimum performance since the power level should be sufficient to establish a signal to noise ratio which will provide an acceptable bit error rate but without the power level exceeding a level at which limiting factors such as the onset of non-linear effects result in degradation of the signal. In wavelength division multiplexed (WDM) transmission, it is desirable to maintain each of the power levels of the individual wavelength components at substantially the same level.

The inventor has disclosed in U.S. Pat. No. 5,513,029 a method of monitoring component power levels in WDM transmission using orthogonal low frequency dither signals and controlling component signal power to maintain optimum performance.

It is also known from GB2314714A that an imbalance of component signal powers in a WDM transmission is likely to occur at an optical amplifier stage, as used to boost signal power at stages in a long distance transmission, utilising optical amplifiers such as erbium doped fibre amplifiers. Such amplifiers have a non-uniform gain characteristic as a function of wavelength which is variable in dependence on the amplifier gain, this change in gain characteristic consequent on change of gain being commonly referred to as dynamic gain tilt.

There is therefore a need to provide optical filtering which is adaptive and which can be used in conjunction with optical amplifiers, or otherwise, in order to maintain a preferred spectral profile of an optical signal.

It is known from Huang et al, IEEE Photonics Technical Letters, September 1996 pp 1243–1245, to provide an acousto-optic tunable filter for dynamic equalization of channel powers. A disadvantage of such a method is that the filters suffer from polarisation sensitivity and severe channel cross talk.

It is also known from Gobel et al, IEEE Photonics Technology Letters, March 1996, pp 446 to 448, to provide a WDM power level compensator in which demultiplexed channels are subject to power control in respective erbium doped waveguides. A disadvantage of this arrangement is that significant distortion of the modulated optical signal occurs.

It is also known from Madsen et al, IEEE Journal of Lightwave Technology, March 1996, pp 437 to 447, to provide fixed (non-adaptive) filters using a sequence of concatenated Mach-Zehnder interferometers in a planar waveguide structure. Such structures require lengths which are difficult to fit onto a single planar waveguide structure and which have an inherent high insertion loss.

Parallel structures on planar waveguides are known from Dragone, IEEE Photonics Technology Letters, September 1991, pp 812 to 815, which provide non-adaptive filtering with output at a single wavelength.

It is also disclosed by S. Day in co-pending application U.S. Pat. No. 08/997,752, now U.S. Pat. No. 5,956,437, to provide a variable optical attenuator by means of localised heating of a waveguide.

Yamada et al, Electronics Letters 1995, 31, pp 360 to 361, discloses a multiplexer using planar waveguide technology and in which a waveguide array is provided with heating strips for each waveguide in order to compensate for phase errors occurring during fabrication. After such compensation, light components passing through the arrayed waveguides are delayed by respective amounts which differ by a constant phase difference between adjacent waveguides so that recombination in a star coupler at the output of the waveguides is dispersive in wavelength to provide separation of the WDM channels, this arrangement thereby being termed an arrayed waveguide grating.

There remains a need to provide an improved optical equalizer, particularly for use in the context of correcting gain tilt in optical amplification stages of a communications system.

SUMMARY OF THE INVENTION

It is an object of the present invention to provide optical equalisation to at least partially compensate for the effects of gain tilt in optical amplifiers.

It is a further object of the present invention to provide an adaptive optical equalizer using planar waveguide technology.

It is a further object of the present invention to provide a method of applying a desired frequency characteristic of equalization by actuating a minimal number of elements of an adaptive optical equalizer.

It is a further object of the present invention to allow the operation of an optical equalizer to be periodically refined to adapt to changing conditions and system tolerances.

According to the present invention there is disclosed a method of applying equalization to an optical signal for use in an optical communications system, comprising steps of:

splitting the optical signal into components having the same frequency characteristic as the optical signal;

transmitting the components via respective waveguides of a waveguide array defining respective optical path lengths;

variably setting at least one of the relative amplitudes of and the phases of the components transmitted via the waveguides; and combining the components transmitted by said waveguides to form an output optical signal whereby interference between said combining components applies equalization to the frequency characteristic of the output optical signal.

According to a further aspect of the present invention there is disclosed a method of controlling an adaptive filter having a set of elements configured such that their combined effect determines a frequency characteristic of equalization applied by the filter; the method comprising the steps of;

actuating the elements according to values of a corresponding set of parameters;

calculating said parameters from complex values of control coefficients by a process which includes a discrete Fourier transform; and including the step of inputting values of amplitude for the control coefficients and calculating respective phase values of said coefficients by a Hilbert transform.

According to a further aspect of the present invention there is disclosed a method of operating an optical filter to apply a desired equalization characteristic to a wavelength division multiplexed optical signal, the method comprising the steps of;

actuating a set of elements of the filter such that their combined effect determines an actual frequency characteristic applied to the optical signal, said elements being actuated according to values of a corresponding set of parameters;

calculating said parameters from control values determined in accordance with said desired equalization characteristic;

measuring the output of the filter and obtaining a measurement of the actual frequency characteristic;

comparing the measurement with the desired frequency characteristic to obtain difference values;

calculating new values of said control values based on said difference values and actuating said elements according to new parameters calculated from said new control values;

and periodically repeating said steps of measuring, actuating and calculating new values to apply an actual equalization characteristic substantially equal to said desired equalization characteristic.

The present invention allows an optical equalizer to be realized using planar waveguide technology by utilising a waveguide array and relatively simple modulators as control elements for modifying the transmission through each waveguide. The calculation of parameters used to determine actuation of the elements of the equalizer can be optimized by use of a Hilbert transform to reduce the number of non-zero parameters requiring corresponding elements to be actuated in accordance with values of the parameters.

The invention further provides the ability to periodically repeat calculation of parameters and actuation of the elements based on feedback of measured output from the equalizer to achieve improved correspondence with a desired equalization by iteration or to remove the effects of system errors.

Preferred embodiments of the present invention will now be described by way of example only.

DETAILED DESCRIPTION

Figure 1:
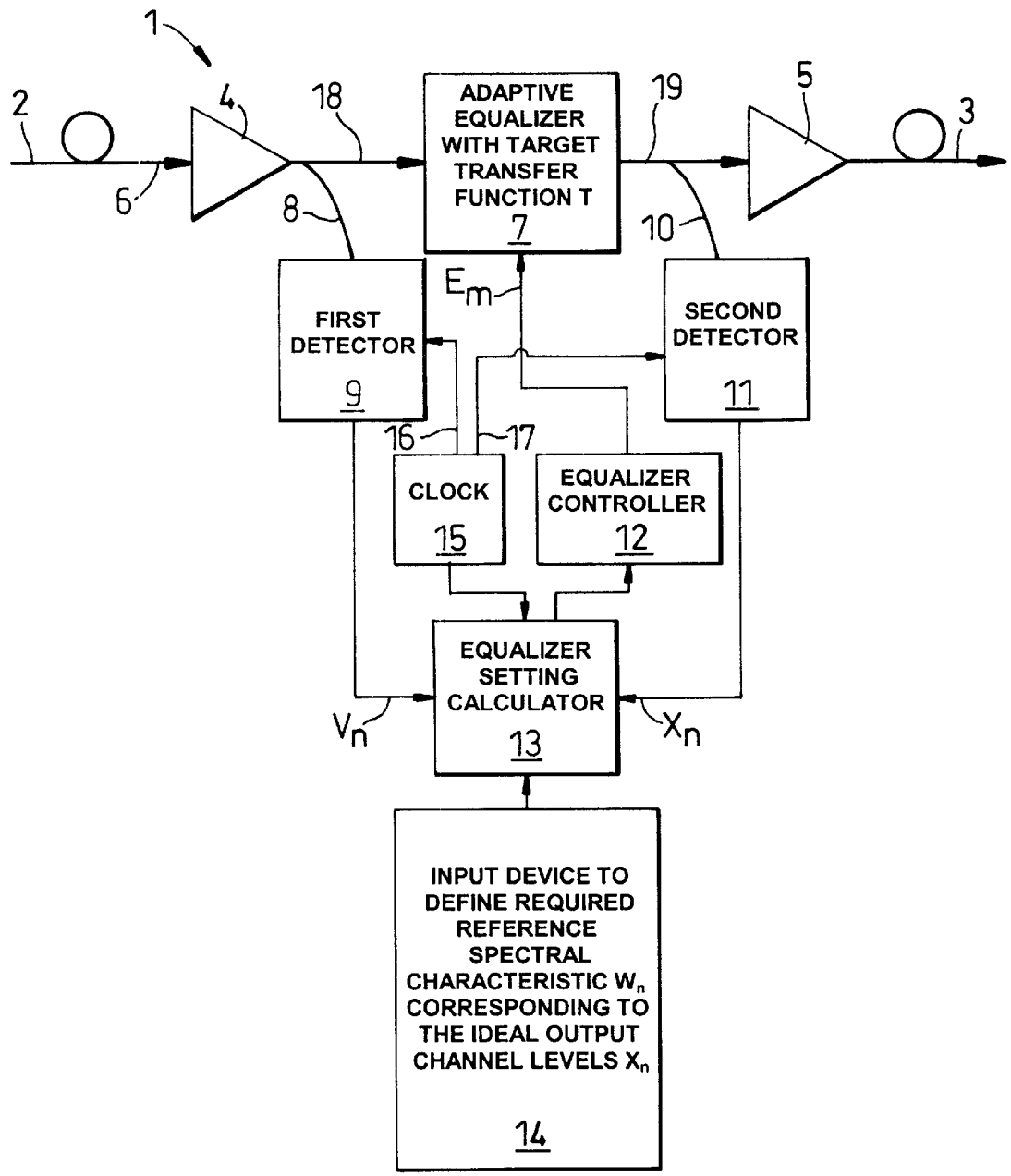
FIG. 1 is a schematic diagram of a line amplifier with an adaptive equalizer.

FIG. 1 illustrates schematically a line amplifier 1 forming part of an optical communications system and connected in line between an input waveguide 2 and an output waveguide 3 in the form of single mode optical fibres.

The line amplifier consists of first and second fibre amplifiers 4 and 5 respectively, each being formed by erbium doped optical fibre amplifiers, the first fibre amplifier receiving an input optical signal 6 via the input waveguide 2. The input optical signal 6 is a WDM (wavelength division multiplexed) signal having N channels separated by 100 GHz where in the present example N=32. The optical signal 18 output from the first fibre amplifier 4 is input to an adaptive equalizer 7, the output 19 of which is input to the second fibre amplifier 5 and amplified before transmission via the output waveguide 3.

A first optical tap 8 provides an optical sample of the optical signal 18 input to the equalizer 7 which is detected and measured by a first detector 9 to provide measurements in the form of input channel levels $V_n$ where n=0 to 31. Similarly, a second optical tap 10 provides an optical sample of the optical signal 19 output from the equalizer 7 which is detected and measured by a second detector 11 producing measured output channel levels $X_n$.

The equalizer 7 is adaptive in the sense of being operable to independently control transmission amplitudes of each of the WDM channels. This may be represented by a transfer function T having complex coefficients $T_n$ relating the amplitude and phase of each component output to its respective input, the coefficients $T_n$ having amplitude $A_n$ (the modulus of $T_n$) and phase arg $T_n$ (the argument of $T_n$). These coefficients $T_n$, are target values representative of E field values arrived at by calculation and applied by calculating corresponding settings $E_m$ of variable components of the equalizer 7. Equalizer controller 12 controls the value of the equalizer settings $E_m$ applied to the variable components of the equalizer 7. The number of settings $E_m$ may be typically greater than the number N of channels and will depend upon the manner in which the equalizer is implemented.

The required values of the equalizer settings $E_m$ are determined by calculator 13 which receives as inputs the measured values of input channel levels $V_n$ and output channel levels $X_n$. An input device 14 is also connected to the calculator 13 to enable a user to input a reference spectral characteristic $W_n$ which serves as a target value to which output channel levels $X_n$ are driven to correspond under ideal operating conditions.

The timing of operation of the first and second detectors 9 and 11 and of the equalizer controller 12 is determined by timing controller 15 which periodically outputs control signals 16 and 17 to the first and second detectors to determine the sampling times at which $V_n$ and $X_n$ are calculated and correspondingly controls the timing at which the settings $E_m$ of the equalizer 7 are updated.

The manner in which the equalizer controller 12 determines the values of settings $E_m$ required to achieve given values of $T_n$ will be described below for a number of examples, including the adaptive equalizer of FIG. 3 in which the equalizer controller 12 outputs equalizer settings $E_m$ to set phase values $P_m$ of phase control elements 39 in a waveguide array 40.

Figure 2:
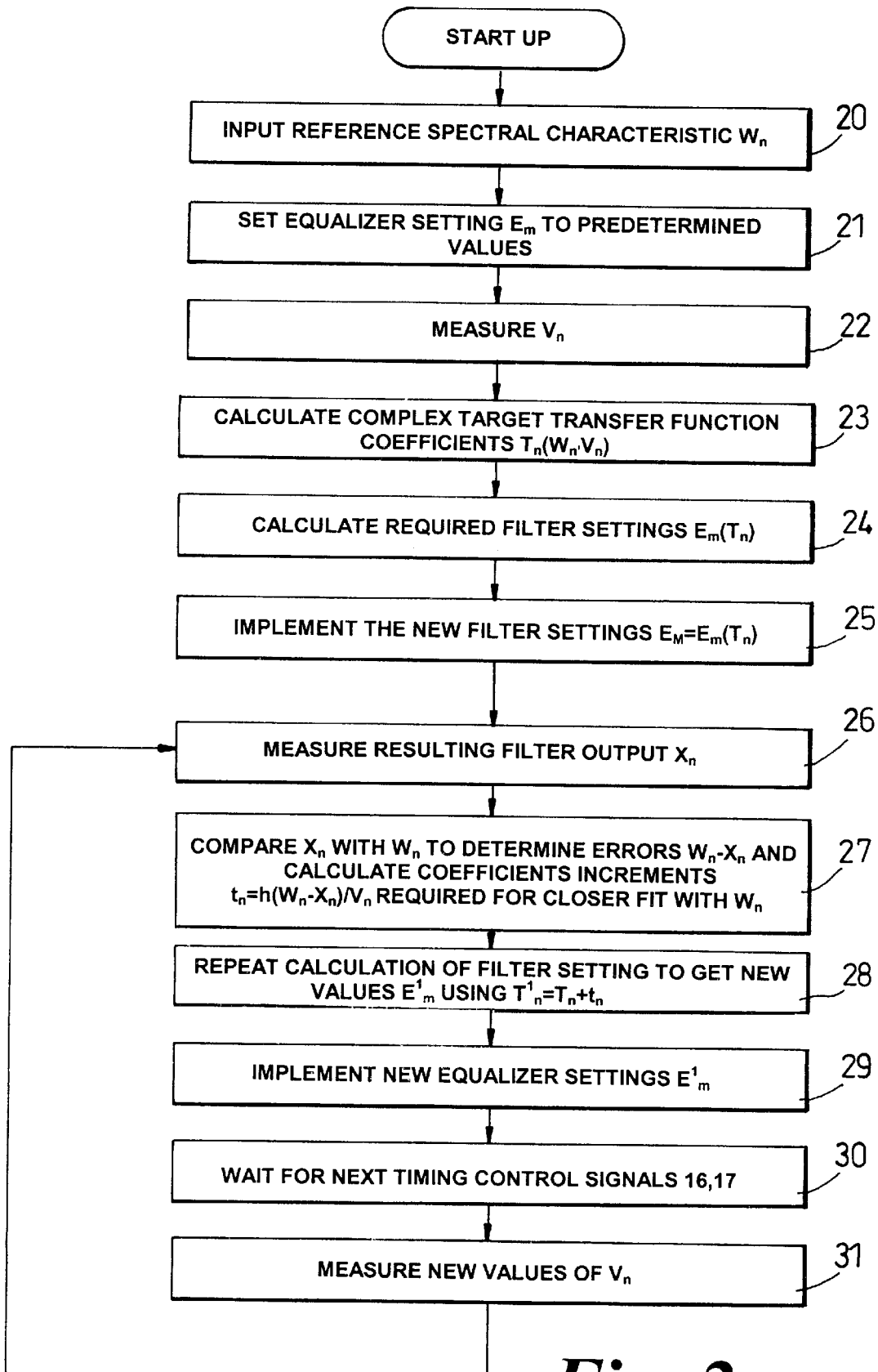
FIG. 2 is a schematic flow chart illustrating a method of operating the equalizer of FIG. 1.

The sequence of operation in the line amplifier 1 is illustrated schematically in FIG. 2. At start-up, an input step 20 inputs the required reference spectral characteristic $W_n$ and the controller 12 sets the equaliser settings $E_m$ to predetermined values at step 21.

At step 22, the first detector 9 detects and measures the input channel levels $V_n$ and outputs the values of $V_n$ to the calculator 13 which at step 23 calculates target transfer function coefficients $T_n$ determined to be required in order to achieve an output $X_n$ from the equaliser 7 which would match the reference spectral characteristic $W_n$. At step 24, the calculator 13 calculates the equaliser settings $E_m$ corresponding to the target transfer coefficients $T_n$ determined at step 23 and at step 25 the equaliser controller 12 outputs control signals to the equaliser 7 to update the equaliser settings $E_m$.

At step 26, the second detector 11 detects and measures the output channel levels $X_n$ and outputs the values of $X_n$ to the calculator 13. At step 27, the calculator 13 compares the spectral profile of the output $X_n$ with the reference spectral characteristic $W_n$. In general, $X_n$ will not be an exact fit to $W_n$ and coefficient increments $t_n$ required to adjust the target transfer function coefficients $T_n$ are calculated from $$t_n = \frac{h(W_n - X_n)}{V_n} \quad (1)$$

where h is a compensating factor (1.7 for example) to optimise feedback control.

Revised values $T^1_n$ of the target transfer function coefficients are then calculated from $$T^1_n = T_n + t_n \quad (2)$$

At step 28, calculation of the equalizer settings $E_m$ is repeated using the updated transfer function coefficients $T^1_n$ and at step 29, the new equaliser settings $E^1_m$ are implemented.

At step 30, the first and second detectors 9 and 11 and the calculator 13 wait for the receipt of the next timing control signal 16 and 17 respectively from the timing controller 15. When the timing control signals 16 and 17 are received, control proceeds to step 31 where the first detector 9 detects and measures the input channel levels $V_n$. Steps 26 to 29 are then cyclically repeated.

A match between output $X_n$ and the reference spectral characteristic $W_n$ is thereby achieved interactively and in a manner which, over time, adapts to variations in the input values $V_n$. A new reference characteristic $W_n$ may be input at any time.

Equalizer Synthesis

Figures 4, 4A:
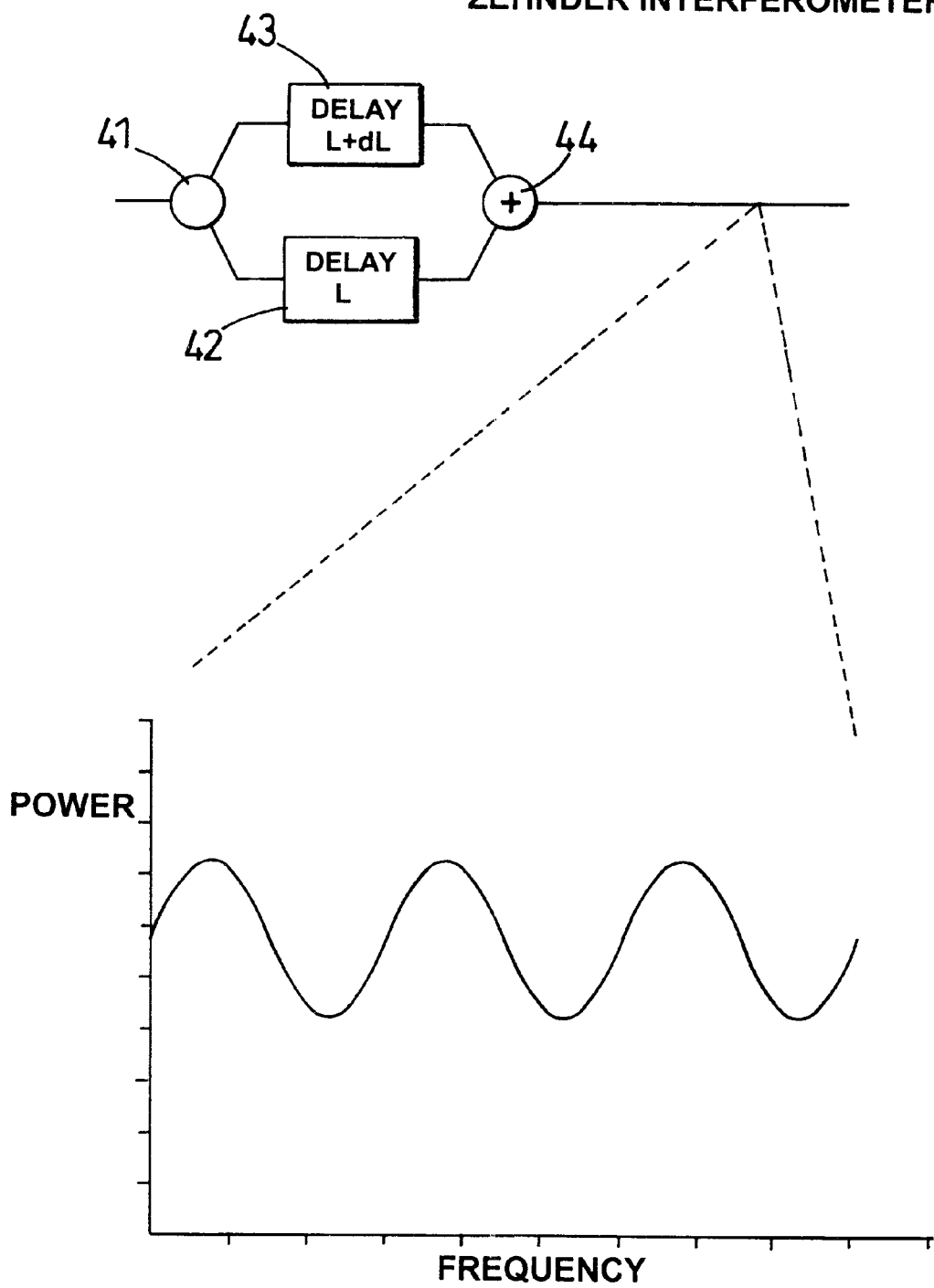
FIG. 4 is a schematic representation of the effect of a two arm Mach Zehnder interferometer.

The equalizer transfer function T is synthesised by the effect of a multiple arm Mach Zehnder interferometer arranged as a parallel waveguide array. The effect of a simple 2 arm Mach Zehnder interferometer is illustrated in FIG. 4 in which a splitter 41 divides an incoming signal into first and second portions, the first portion being passed through a delay 42 provided by a length of waveguide L, the remaining portion being passed through a second delay 43 represented by a waveguide of length L+dL, and the outputs from delays 42 and 43 being additionally combined in a combiner 44. The combined output is modulated in frequency space as illustrated graphically in FIG. 4a, the modulation being sinusoidal with a period which is inversely proportional to dL.

Figure 5:
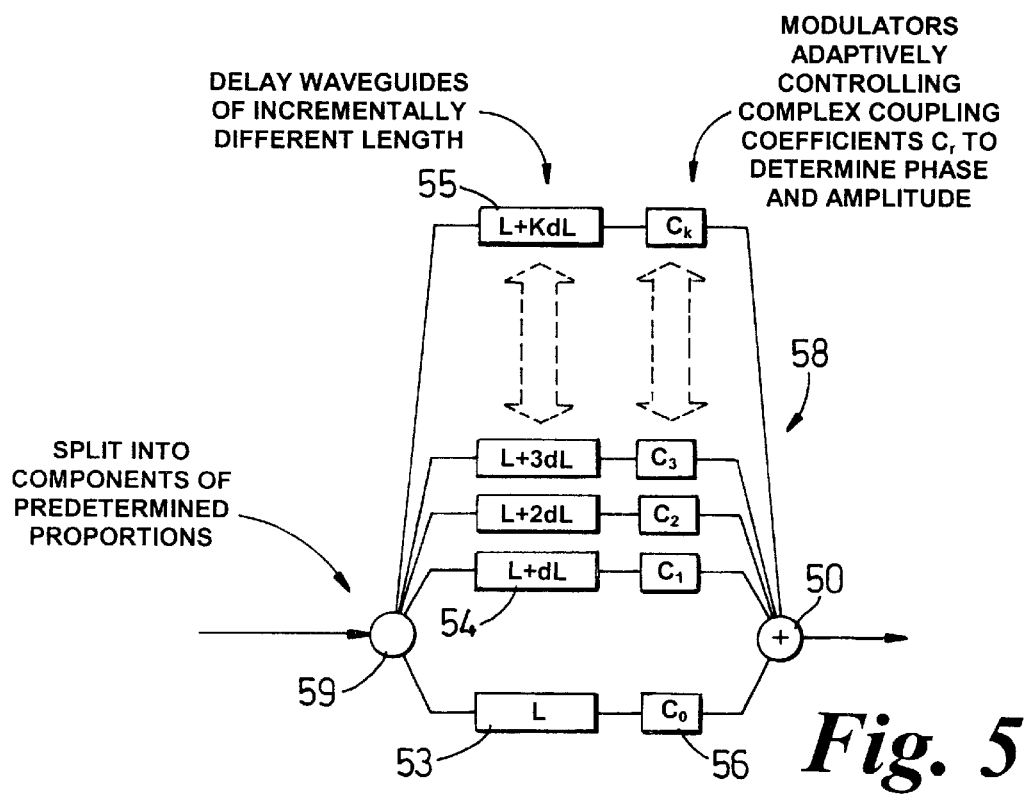
FIG. 5 is a schematic representation of the effect of a multiple arm Mach Zehnder interferometer configured by a parallel waveguide array having control elements for frequency response synthesis.
Figure 5A:
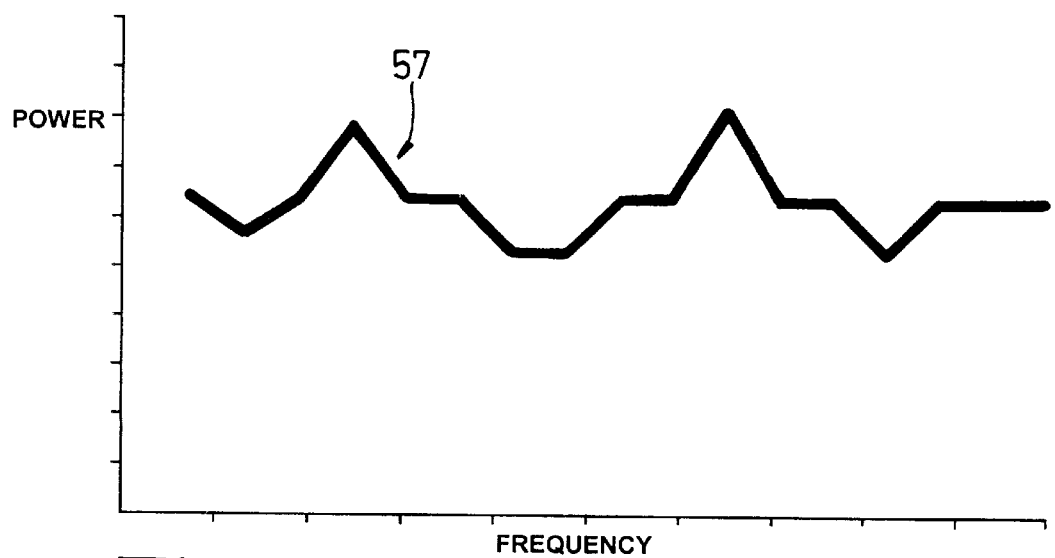

FIG. 5 shows the effect of a multiple arm Mach Zehnder interferometer in the form of a parallel waveguide array 58, a series of delays L, L+dL, L+2dL . . . . L+KdL being provided by delay waveguides 53 to 55. The contribution made by each of the delay waveguides 53 to 55 to the output combined by a combiner 50 is adaptively controlled by means of a set of modulators 56 where each of the delays 53 to 55 is provided with a respective modulator. Each modulator 56 is capable of independently setting an amplitude and phase modulation to the component transmitted through the corresponding delay 53 to 55, the values of the amplitude and delay being characterised by complex coupling coefficients $C_r$, r=0 to K where there are K+1 waveguides. The term "phase modulation" here implies a variation in optical path length resulting in a corresponding phase variation at the point of combination in combiner 50.

The power transmission of the multi-arm Mach Zehnder interferometer of FIG. 5 is $$Z = \left\| \sum_{r=0}^{k} C_r \exp\{iL_r vf\} \right\|^2 \quad (3)$$

where $v = 2\pi/c$. (optical density of waveguide)
  $L_r$=differential length of waveguides,
    c=speed of light,
    f=optical frequency.

The result of the summation of the outputs from the modulated delay waveguides is illustrated schematically as a spectral profile 57 having a form which is related to the values of $C_r$, r=0 to K, by a discrete Fourier transform. This relationship may be derived by considering the form of $\sqrt{Z}$ from equation 3 and the usual definition of the discrete Fourier transform. This relationship provides the basis for synthesis of the required frequency response where $W_n$ and $T_n$ referred to above are expressed in common with $\sqrt{Z}$ in units of $\sqrt{\text{(Power)}}$.

The adaptive equalizer of FIG. 1 requires the spectral profile 57 to correspond to the target transfer function T at each of the N frequencies for which $T_n$ are defined, i.e. the frequencies for which signal carrying channels are to be equalized. Implementation of the equalizer therefore requires that the value of dL is set appropriately in the array of FIG. 5, that there is an appropriate number of K+1 waveguide delays 53 to 55, and that the complex coupling coefficients $C_r$ are calculated to provide the required spectral profile 57 and then implemented in hardware to provide the required amplitude and phase modulation.

The approach taken in calculating the coefficients $T_n$ and the complex coupling coefficients $C_r$ in the preferred embodiment takes as a starting point the assumption that it is preferable to calculate the coefficients $T_n$ for N frequencies corresponding in both number and frequency value to the N wavelength channels of the input signal to be processed. The alternative would be to rely upon some form of interpolation between values not necessarily corresponding to the input frequencies, this latter option being believed to be insufficiently precise for most applications but which could under certain circumstances be adopted.

The Hilbert Transform

The calculation of a fast Fourier transform is utilised to develop the values of the complex coefficients $C_r$ from the values of coefficients $T_n$. Generally this will result in there being N complex coupling coefficients $C_r$. Since the number of coupling coefficients $C_r$ determines the number of waveguides in the waveguide array, it would be advantageous to reduce this number if possible, thereby simplifying the required hardware and control effort required to configure the settings corresponding to the complex coupling coefficients. Such a reduction is achieved in accordance with the present invention by means of a Hilbert transform of the coefficients $T_n$ which would retain the amplitudes of the coefficients unchanged but which would provide phase values selected such that, after Fourier transform, those transformed coefficients $C_r$ corresponding to negative frequency amplitudes become zero. In this way it is unnecessary to provide waveguides and modulators corresponding to the zero value coupling coefficients, the number of non zero coupling coefficients being reduced to R where $$R = \frac{N}{2} + 1 \quad (4)$$

Figure 6:
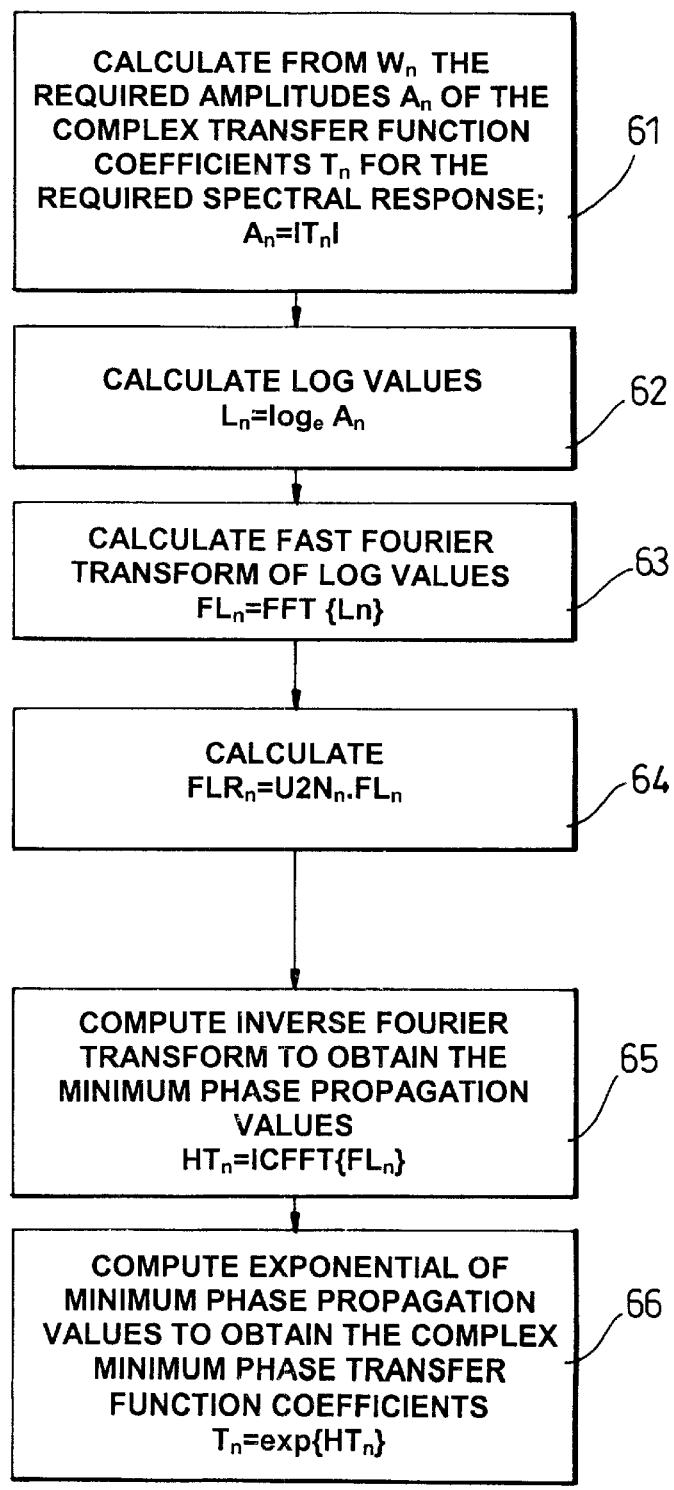
FIG. 6 is a schematic flowchart illustrating the application of a Hilbert transform.

The manner in which the Hilbert transform of the coefficients $T_r$ is implemented is illustrated in the flow chart of FIG. 6. The underlying premise is that for the complex coefficients $T_n$, the phase values can be arbitrarily set to any convenient values since only the transmission amplitudes $A_n$ are important, where $$A_n = |T_n| \quad (5)$$

At step 61 of FIG. 6, the required amplitudes $A_n$ of the complex transfer function coefficients $T_n$ are calculated from the input reference spectral characteristic $W_n$, the amplitudes $A_n$ being numbers in the range 0 to 1 and having a maximum value equal to 1. The phase arg $(T_n)$ of the coefficients $T_n$ can be arbitrarily net to zero at this point of the calculation.

At step 62, the propagation values $L_n$ are calculated as the logarithm of the amplitudes $A_n$;

$$L_n = \log_e A_n \quad (6)$$

At step 63, a fast Fourier transform of the propagation values is calculated to obtain Fourier transform coefficients $FL_n$.

At step 64, those Fourier transform coefficients $FL_n$ corresponding to negative frequency components are set to zero, represented by a multiplication $FL_n$ by a function $U2N_n$;

$$FLR_n = U2N_n \cdot FL_n$$

where $U2N_n = 1$ if $n=0$ or $n=N/2$ $U2N_n = 0$ if $0 < n < N/2$, $U2N_n = 2$ if $n > N/2$ \quad (7)

At step 65, the inverse Fourier transform of the resulting coefficients is calculated to obtain propagation values $HT_n$. Since the inverse transform coefficients obtained after setting the negative frequency components to zero is commonly referred to as a minimum phase condition, these propagations are referred to as minimum phase propagation values $HT_n$.

At step 66, the exponential of the minimum phase propagation values $HT_n$ is computed to obtain the minimum phase transfer function coefficients $T_n$, each of which has its original amplitude $A_n$ and now a phase arg $T_n$ component determined according to the minimum phase condition provided by the Hilbert transform.

Implementing the Equalizer Transform Function

For a given transfer function defined by transfer function coefficients $T_n$, where n=0 to N-1, implementation of the transfer function requires calculation of complex E field coupling coefficients $C_n$ which are the result of a fast Fourier transform of $T_n$. Discarding the coupling coefficients $C_n$ having zero amplitude as a result of the Hilbert transform (i.e. those corresponding to negative frequencies) a reduced set $C_r$ of complex E field coupling coefficients, r=0 to N/2, are defined. Each of the $C_r$ represents the amplitude and phase of the coupling required through the respective waveguide of array 58 in FIG. 5.

In order to minimise the overall attenuating effect of applying the amplitudes of $C_r$, the set of values $C_r$ is normalised by dividing each of the values of $C_r$ by the largest value of the set, the resulting scaled set $C_r$ being a set of positive numbers less than or equal to unity.

Figure 3:
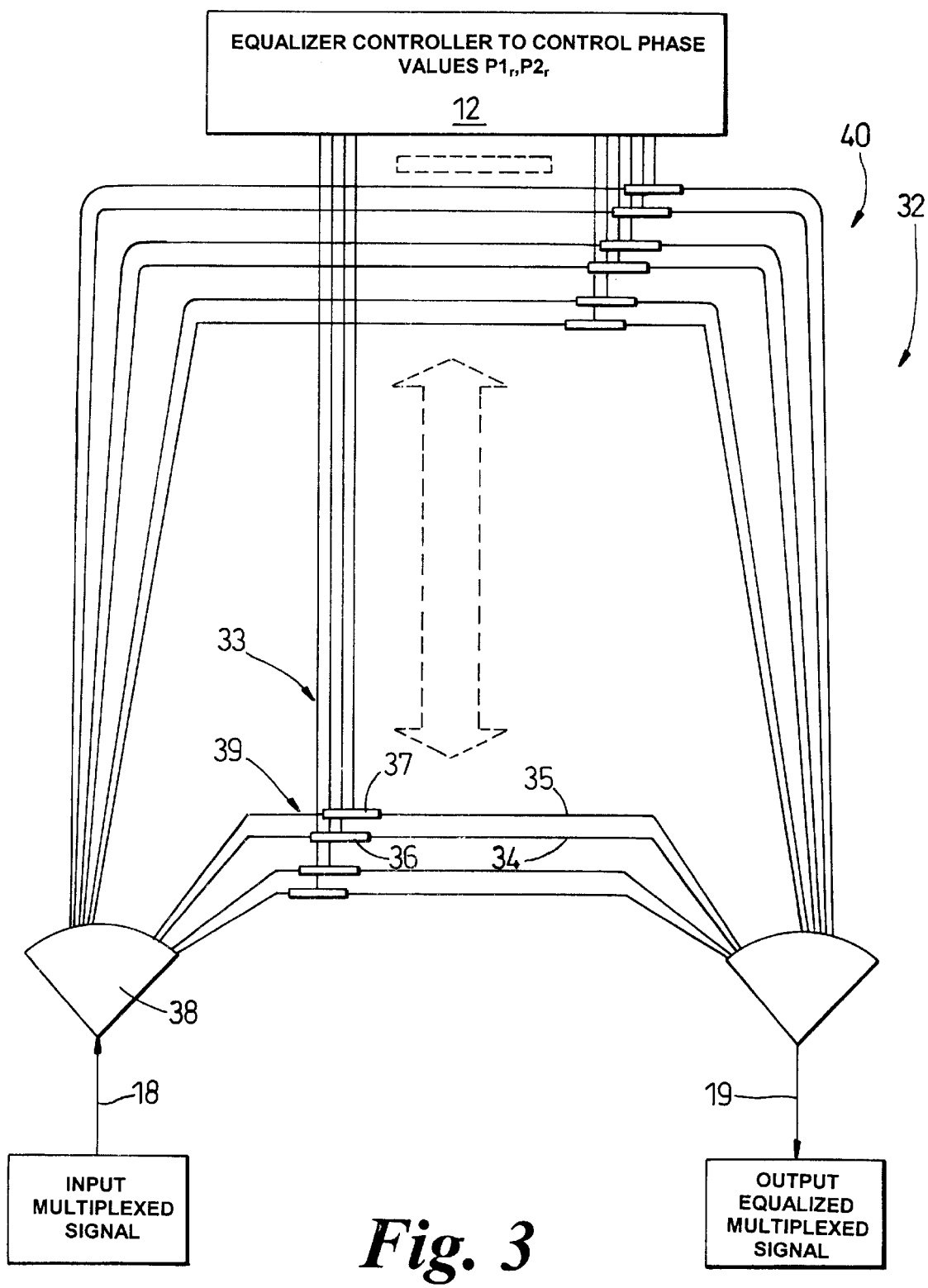
FIG. 3 is a schematic layout of the equalizer of FIGS. 1 and 2 in the form of a planar waveguide array.

FIG. 3 illustrates a preferred apparatus and method of implementing the controlled waveguide array 58 of FIG. 5. In FIG. 3, the waveguide array 40 is defined by channel waveguide regions of a planar dielectric slab 32 and each waveguide of the array is provided with a respective phase control element 39 constructed as a thin film heater applied locally to a small portion of the waveguide and connected by electrical connectors 33 to an equaliser controller 12 which selectively actuates and controls the heating effect for each control element. Localised heating at each control element 39 provides a controlled change in optical path length in the respective waveguide, thereby in effect providing a phase control element.

The waveguide array 40 is constructed using silica on silicon technology in which a silica buffer layer is deposited on a planar silicon substrate, a core glass layer of doped silica then being deposited on the buffer layer before adding a higher refractive index cladding glass layer of germanium doped silica. Deposition in each case is by enhanced chemical vapour deposition. The phase control elements 39 are formed by patterning a sputtered layer of chrome to provide Joule-effect heaters.

In the waveguide array 40 of FIG. 3, each of the modulators 56 shown in FIG. 5 is implemented by having a respective pair of waveguides such as for example first and second waveguides 34 and 35 having respective first and second phase control elements 36 and 37.

Each of the first and second waveguides 34 and 35 has nominally the same length L+dL, corresponding to delay waveguide 54 of FIG. 5, and the values applied to the first and second phase control elements 36 and 37 determine the amplitude and phase of coupling coefficient $C_1$. Representing the phase values applied by the first and second phase control elements 36 and 37 as $P1_1$ and $P2_1$ respectively, the resulting amplitude and phase of the combined output from waveguide 34 and 35 is determined by choice of $P1_1$ and $P2_1$ since in effect waveguides 34 and 35 constitute a Mach Zehnder interferometer whose output is determined by interference.

Each of the waveguides in the array 40 receives as its input a portion of the input multiplexed signal 18 divided. For the present example, division into equal proportions will be assumed by a splitter 38 constituted by a star coupler constructed as a free space region in the slab 32.

The value of $C_1$ is therefore given by:

$$C_1 = \exp iP1_1 + \exp iP2_1 \quad (8)$$

For given values of the amplitude and phase of coupling coefficient $C_1$, phase values $P1_1$ and $P2_1$ may be calculated since the amplitude of $C_r$ is determined by the difference in phase values $P2_1-P1_1$. By choosing $P2_1-P1_1$ such that:

$$|C_1|=1+exp[i(P2_1-P1_1)] \quad (9)$$

The phase difference $P2_1-P1_1$ is then determined as:

$$P2_1 - P1_1 = \cos^{-1}\left[\frac{|C_1|^2}{2} - 1\right] \quad (10)$$

From equation 8, $P1_1$ can be expressed as:

$$P1_1 = arg\ C_r - arg[1+exp\{i(P2_1-P1_1)\}] \quad (11)$$

$P1_1$ may therefore be calculated by substituting $P2_1-P1_1$ from equation 10.

$P2_1$ may then be calculated using equation 10.

Corresponding calculations for each $C_r$ may similarly be made to determine phase values $P1_r$ and $P2_r$.

For the embodiment of FIG. 3 therefore, the equaliser settings $E_m$ referred to in FIG. 2 are constituted by the set of phase values $P1_r$, $P2_r$ where r is 0 to N/2.

In the embodiment of FIG. 1 in which N=32, the waveguide array 40 of FIG. 3 consists of seventeen pairs of waveguides provided with respective phase control elements 39.

Figure 14:
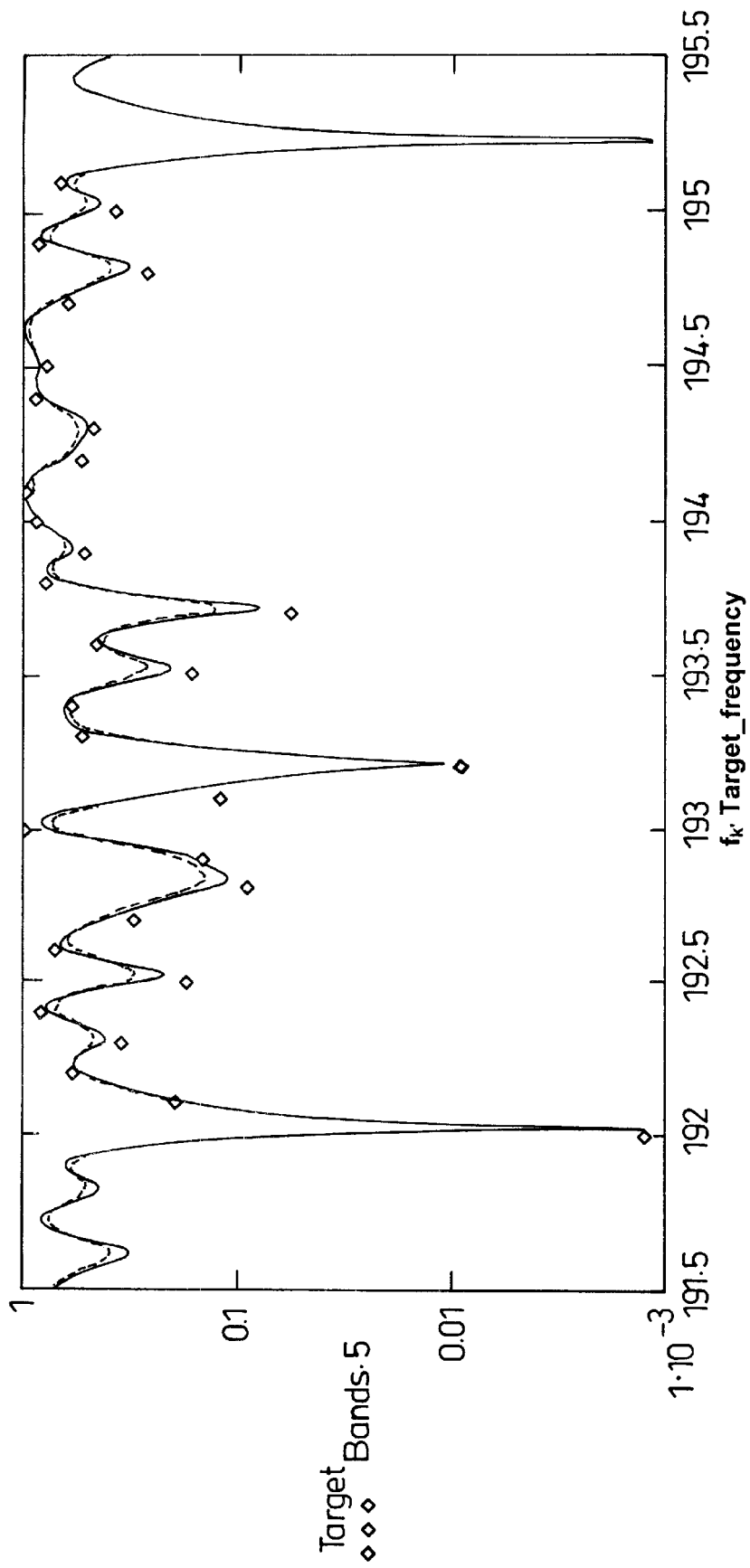
FIG. 14 is a graphical representation of the results of simulation of the optical equalizer of FIG. 3 for a randomly generated target frequency characteristic.

The results obtained by mathematically modelling the embodiment of FIG. 3 are shown in FIG. 14 where the curve represents the transfer function achieved in response to target values represented by rhomboids.

Optimum Power Splitting

In the generalised arrangement of FIG. 5, the power splitter 59 determines the distribution of power to each of the modulators 56 which apply the coupling coefficients $C_r$ associated with respective delay waveguides 53 to 55. As described above with reference to FIG. 3, the splitter 38 may be arranged to deliver equal shares of the available input multiplex signal power to each pair of waveguides forming the array 40. In many applications however, such as in the case of flattening the gain of an optical amplifier, the required reference spectral characteristic $W_n$ has a flat profile. This corresponds to $C_1$ having a value of unity and the remaining coupling coefficients having zero values so that the transmitted power is reduced by a factor of 1/17.

Such severe attenuation may not be acceptable.

A further difficulty is that it may be difficult in practice to obtain exactly equal power division due to systematic errors such as manufacturing tolerances in the splitter 38.

Figure 7:
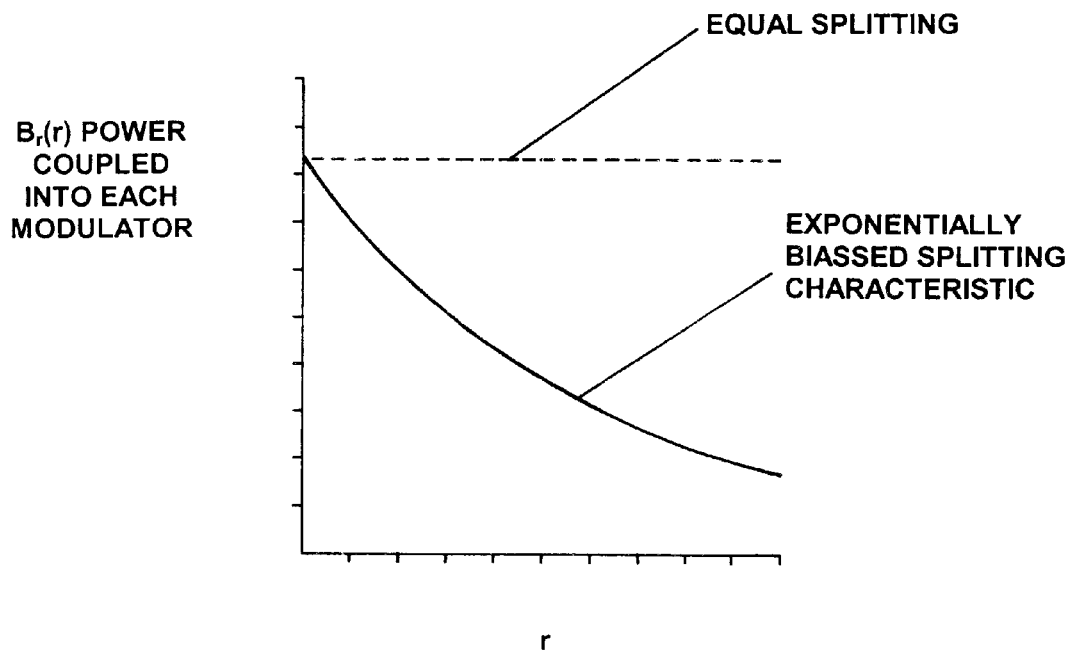
FIG. 7 is a graphical representation of the biased distribution of input signal into waveguides of the array.

In an alternative embodiment, the embodiment of FIG. 3 is modified to include a splitter 38 in which the power coupled into each modulator $C_r$ is tailored to the particular application. The power $B_r(r)$ coupled into each modulator $C_r$ may for example be biased to decay exponentially with increasing values of r as illustrated in FIG. 7, such an arrangement being found to provide adequate control while minimising attenuation. In order to take account of the characteristic of coupled power $B_r(r)$, the scaling step in which $C_r$ is normalised requires modification by dividing the normalised values of $C_r$ by the respective value of $B_r(r)$ to form:

$$C_r = \frac{C_r}{B_r(r)} \quad (12)$$

Subsequent calculation such as described with reference to equations 8 to 11 to determine the equaliser settings is then conducted using $C_r$ instead of $C_r$.

The first described embodiment of FIG. 3 may therefore be regarded as being the result of setting $B_r(r)$ to a uniform power distribution in which each value of $B_r(r)$ equals 1.

Any departure from the intended distribution of $B_r(r)$ may be determined by calibration and the actual measured values of $B_r(r)$ used in equation 11, for any desired shape of $B_r(r)$ including the nominally flat characteristic of the FIG. 3 embodiment, in order to correct for systematic errors in the implementation of power splitter 38.

Figure 8:
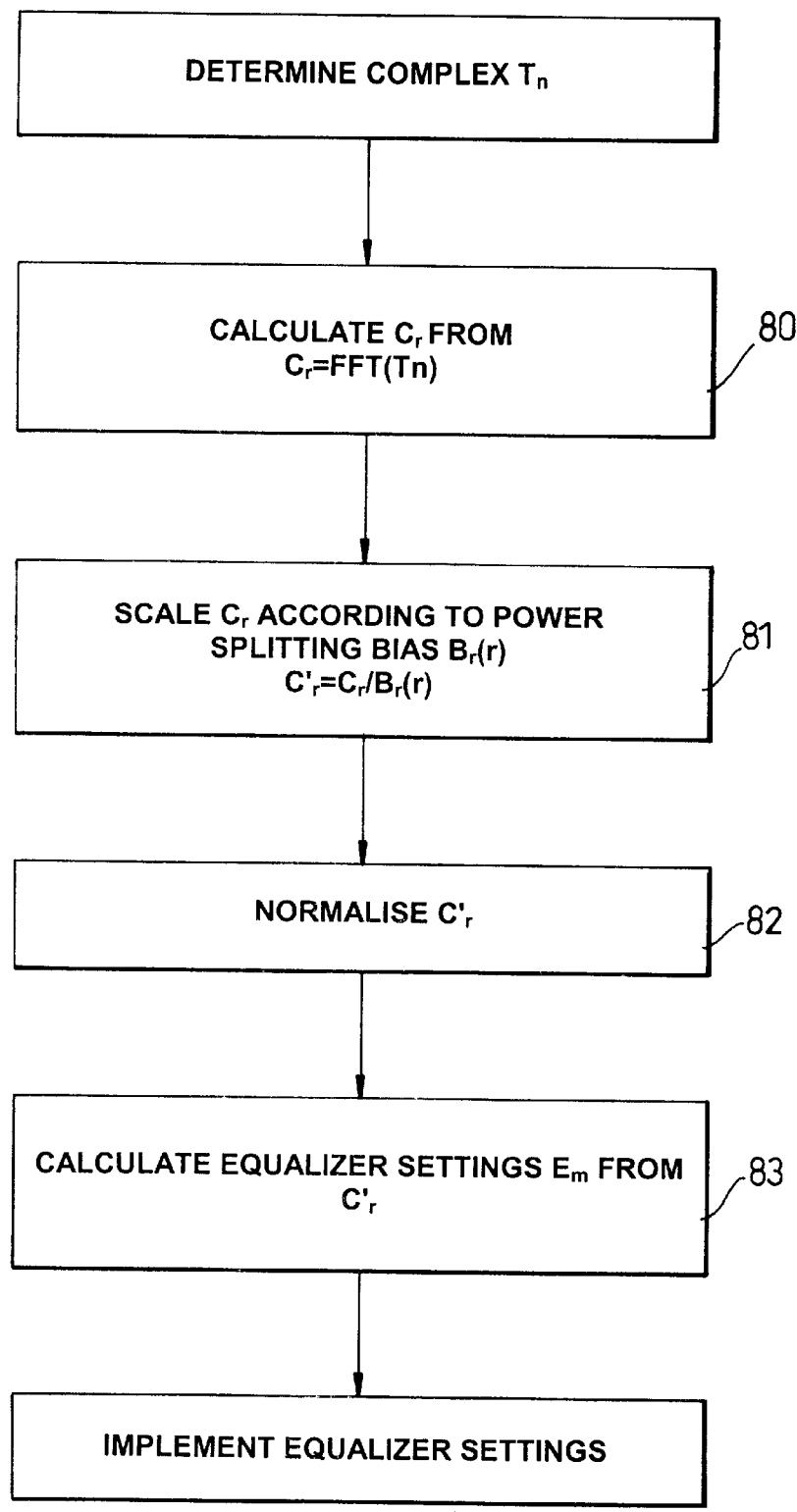
FIG. 8 is a flowchart illustrating the calculation of coupling coefficients.

FIG. 8 illustrates schematically the manner in which the equaliser settings $E_m$ are derived for both steps 24 and 28 in FIG. 2. At step 80, $C_r$ is calculated as the fast Fourier transform of $T_n$ and at step 81, the values of $C_r$ are adjusted according to the required power splitting bias profile $B_r(r)$ to determine $C'_r$.

The values of $C'_r$ are then normalised at step 82 and at step 83 the values of the equaliser settings $E_m$ are calculated based on the values of $C'_r$.

Implementing the Equalizer Transform Function Using Only Phase Control Elements and with Three Waveguides per Coupling Coefficient The arrangement of FIG. 3 utilizes pairs of waveguides such as first and second waveguides 34 and 35 with associated phase control elements 36 and 37 to synthesise the coupling coefficient $C_r$ of each arm of the multiple Mach-Zehnder waveguide array of FIG. 5. In practice, the range of phase control available to each of the elements 36 and 37 may be limited and it may therefore be advantageous to replace the pairs of waveguides of FIG. 3 with triplets as shown in the embodiment of FIG. 9 where three waveguides are provided to implement each coupling coefficient $C_r$.

Figure 9:
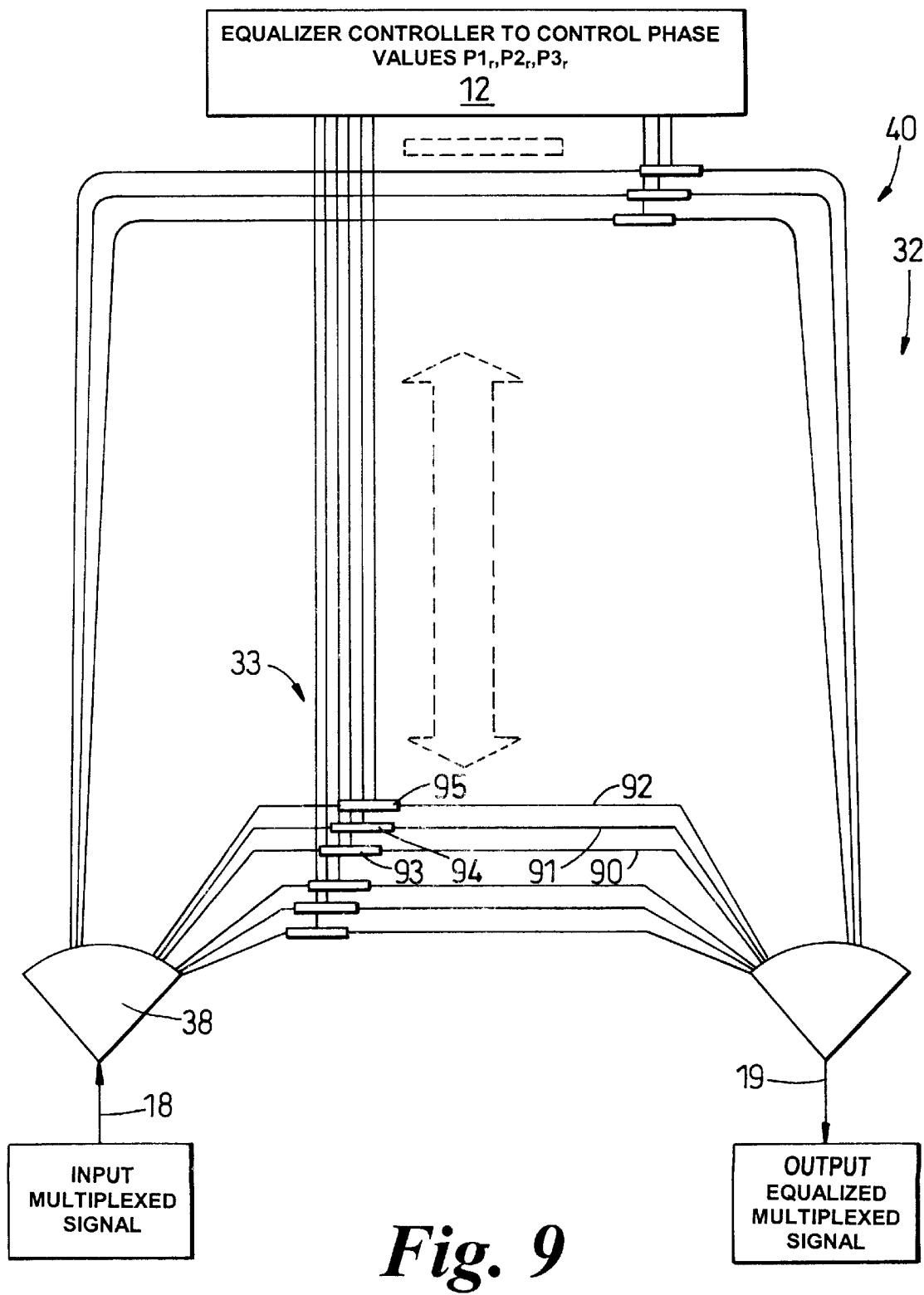
FIG. 9 is a schematic representation of a further waveguide array having three waveguides per coupling coefficient.

In the embodiment of FIG. 9, each of the complex coupling coefficients $C_r$ is synthesised by setting control phase values $P1_r$, $P2_r$ and $P3_r$ for associated waveguides forming a triplet, such as waveguides 90, 91 and 92. This requires that the equalizer controller 12 dynamically controls the first, second and third phase control elements 93, 94 and 95 respectively.

Figure 10:
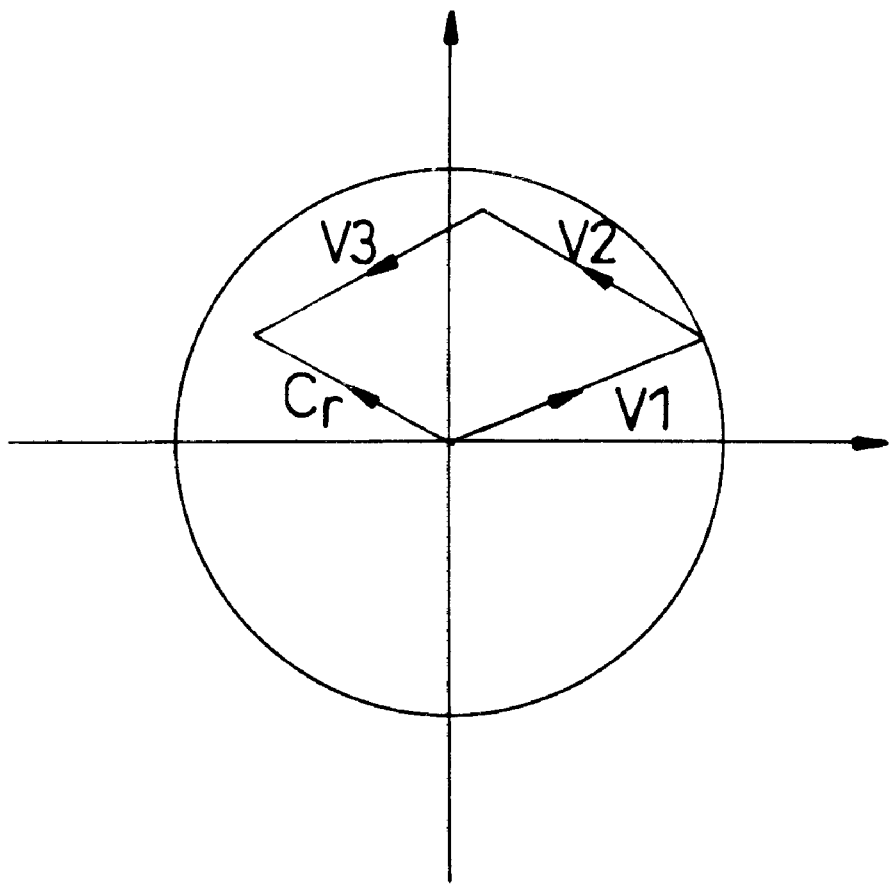
FIG. 10 is a representation of vector addition in the real-imaginary plane to synthesize the coupling coefficients of FIG. 9 using three waveguides per coupling coefficient.

The value of the coupling coefficients is then given by:

$$C_r = exp\ iP1_r + exp\ iP2_r + exp\ iP3_r \quad (13)$$

as illustrated graphically in FIG. 10 where vectors V1, V2 and V3 in the real/imaginary plane having phase angles $P1_r$, $P2_r$ and $P3_r$ are vectorially added to provide the complex number representative of the coupling coefficient $C_r$.

The use of three such unit vectors allow greater flexibility in implementing changes in $C_r$ without major discontinuities in values of the phase angles which might otherwise be required if only two vectors were available under conditions where a limited range of each phase angle is available.

Figure 11:
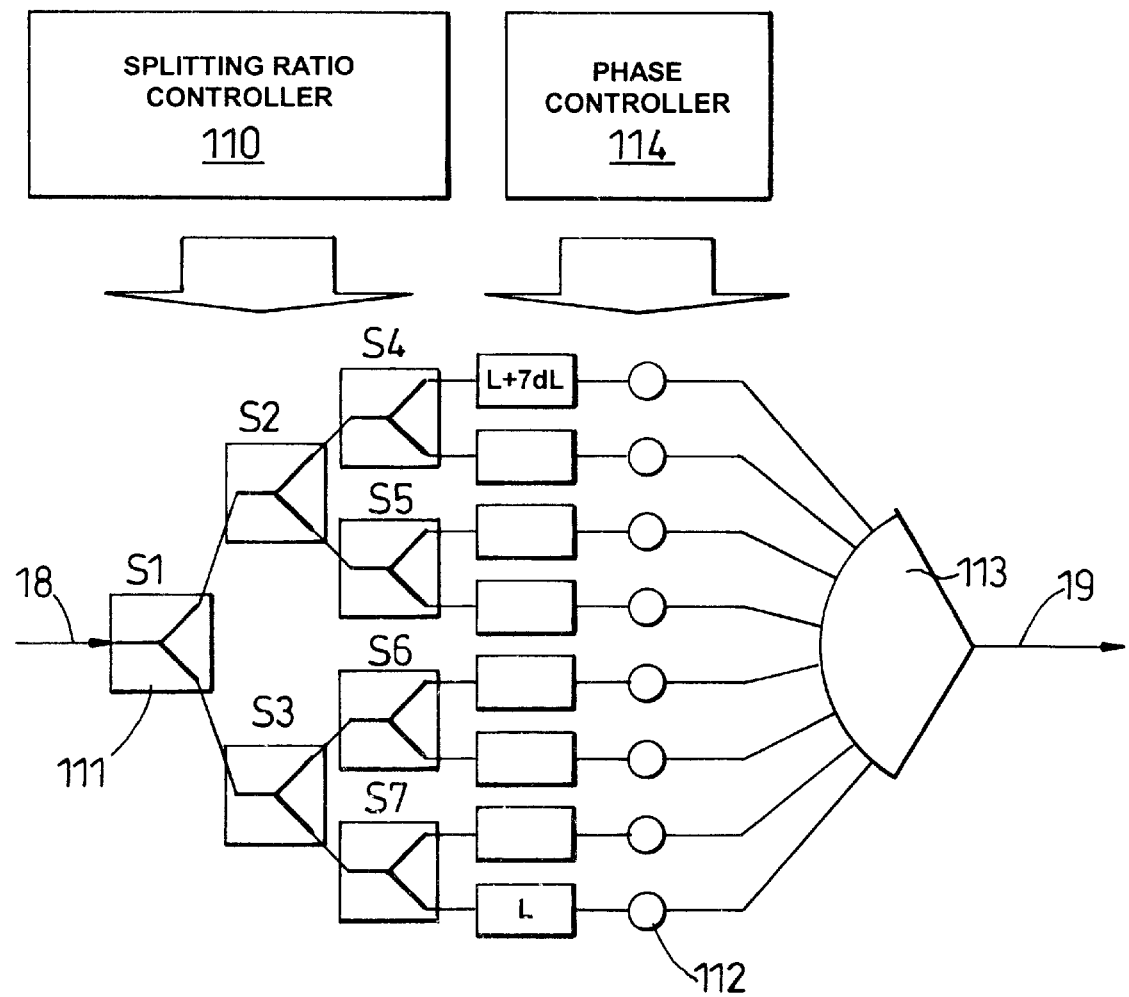
FIG. 11 is a schematic representation of an alternative equalizer having a waveguide array with dynamically controlled splitting of input signal and phase control elements.

Alternative Waveguide Configuration of FIG. 11 Using Dynamically Controlled Splitting in Combination with Phase Control Elements FIG. 11 shows an alternative waveguide array which differs from the arrangement of FIGS. 3 and 5 in that the proportion of the input signal split into each of the waveguides is dynamically controlled by a splitting ratio controller 110. Such splitting control is implemented by a series of Y splitters 111, each of which receives an electrical control signal from the splitting ratio controller 110 to determine the proportion of input signal directed into each one of the output arms of the Y splitter.

In FIG. 11, an equalizer for N=16 channels is formed by eight waveguides having lengths increasing incrementally from L to L+7dL, each waveguide being provided with a respective phase control element 112, and the outputs being combined in a star coupler 113.

The complex coupling coefficients $C_r$ are therefore defined for each waveguide such that the controlled splitting ratios determine the amplitude (modulus of $C_r$) and the phase control elements determine the phase (the argument of $C_r$).

The equalizer of FIG. 11 provides equalization for a WDM signal of 16 channels with 100 GHz channel separation. The difference in length between waveguides is 0.272 mm.

The manner of operation of the embodiment of FIG. 11 otherwise corresponds to that of FIG. 3 and the variants thereof described above.

Figure 12:
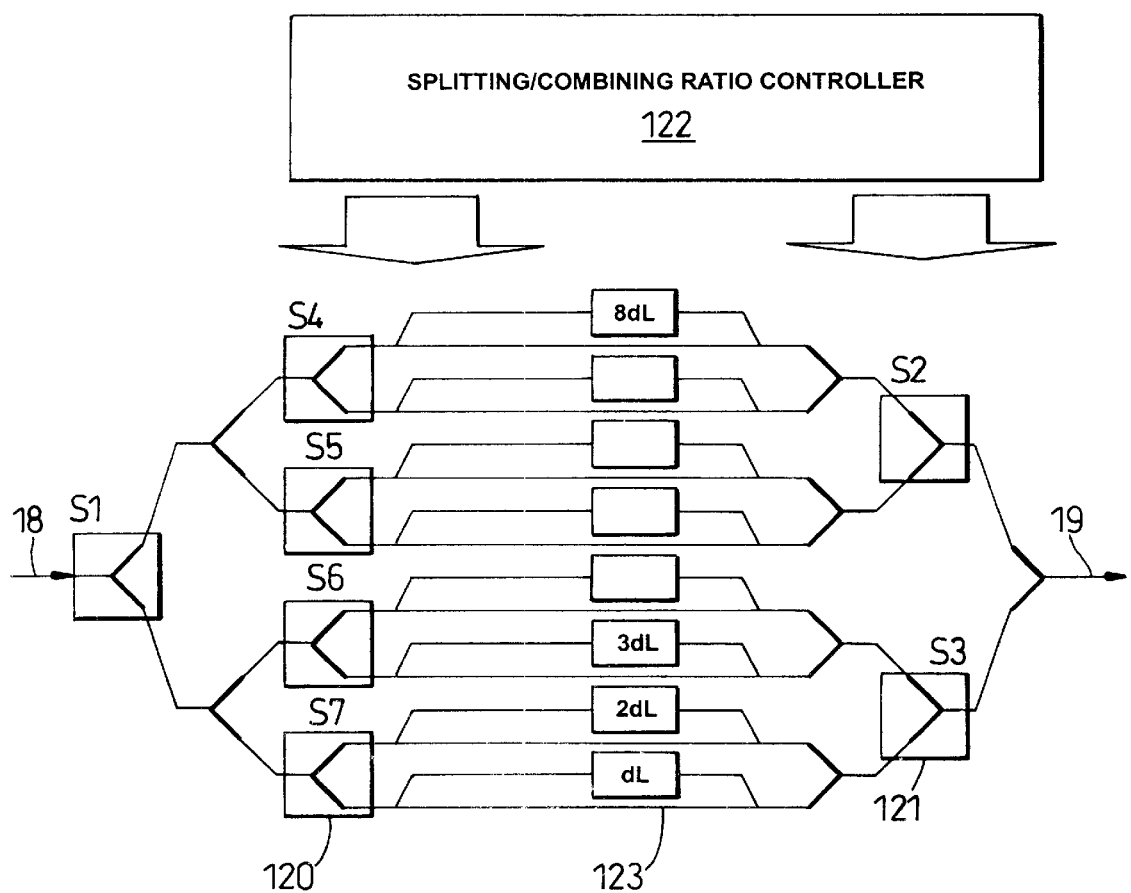
FIG. 12 is a schematic representation of a further alternative waveguide array equalizer with dynamically controlled Y splitters/combiners.

Further Alternative Waveguide Configuration of FIG. 12 Using Dynamically Controlled Y Splitters/Couplers FIG. 12 shows an alternative waveguide array in which splitting o f the input optical signal is accomplished using dynamically controlled splitters 120 and the output combined using dynamically controlled couplers 121, each of these splitters and couplers 120, 121 consisting of a Y junction i n which the proportion of mixing/combination is electrically controllable by controller 122 which actuates localised heating elements at the couplers 121. In FIG. 12, an equalizer for N=8 is shown, for a WDM signal with 100 GHz spacing between channels. The difference in length between waveguides is 0.136 mm.

The waveguide array is configured such that, for each one of the N frequency channels at which $T_n$ is defined, a two arm interferometer with differential length element 123 is defined, the inputs to the interferometers being delivered via Y splitters and the outputs combined thereafter by Y couplers of which splitting and coupling ratios are thermally controlled to determine the proportion of input signal 18 conducted by each one of the interferometers.

The proportion of the input signal conducted into each one of the interferometers is proportional to coupling coefficient $C_r$.

Implementation of the equaliser of FIG. 12 requires that the values of $T_n$ are determined, from which the coupling coefficients $C_r$ may then be computed. The values of splitting ratios S1 to S7 may then be calculated and applied to the Y splitters 120 and Y couplers 121 as illustrated in FIG. 12.

In order to obtain splitting ratios which are (of necessity) positive ratios, coupling coefficient $C_o$ is selected to be much larger than the remaining coupling coefficients and is held consequent, i.e. $C_o$ is not independently controlled.

Since there is no provision for setting phase values of the coupling coefficients, zero phase (i.e. real values) of $C_r$ are required. This is achieved by forming a set of values $T_n$ where n=1 to 2N and each of the values of $T_n$ for n greater than N is defined by:

$$T_n = T_{2N-n} \text{ for } n > N \quad (14)$$

This repeats the sequence $T_n$ in reverse order and creates symmetry such that the Fourier Transform contains only cosine (i.e. real) terms. This technique is sometimes referred to as a discrete cosine transformation (DCT).

The fast Fourier transform of the expanded set of $T_n$ is then computed to obtain a set of N coupling coefficients $C_r$ which have real values (i.e. zero phase).

In order to minimise losses, the values of $C_r$ are then adjusted by finding the smallest value and subtracting this value from each of the N values of $C_r$. This makes at least one of the values 0 and the remainder positive.

The splitting ratios S1 to S7 are then calculated and applied to the equaliser.

The configuration of FIG. 1 may then be used to periodically update the values of coupling ratios to achieve the required equalisation.

Figure 13:
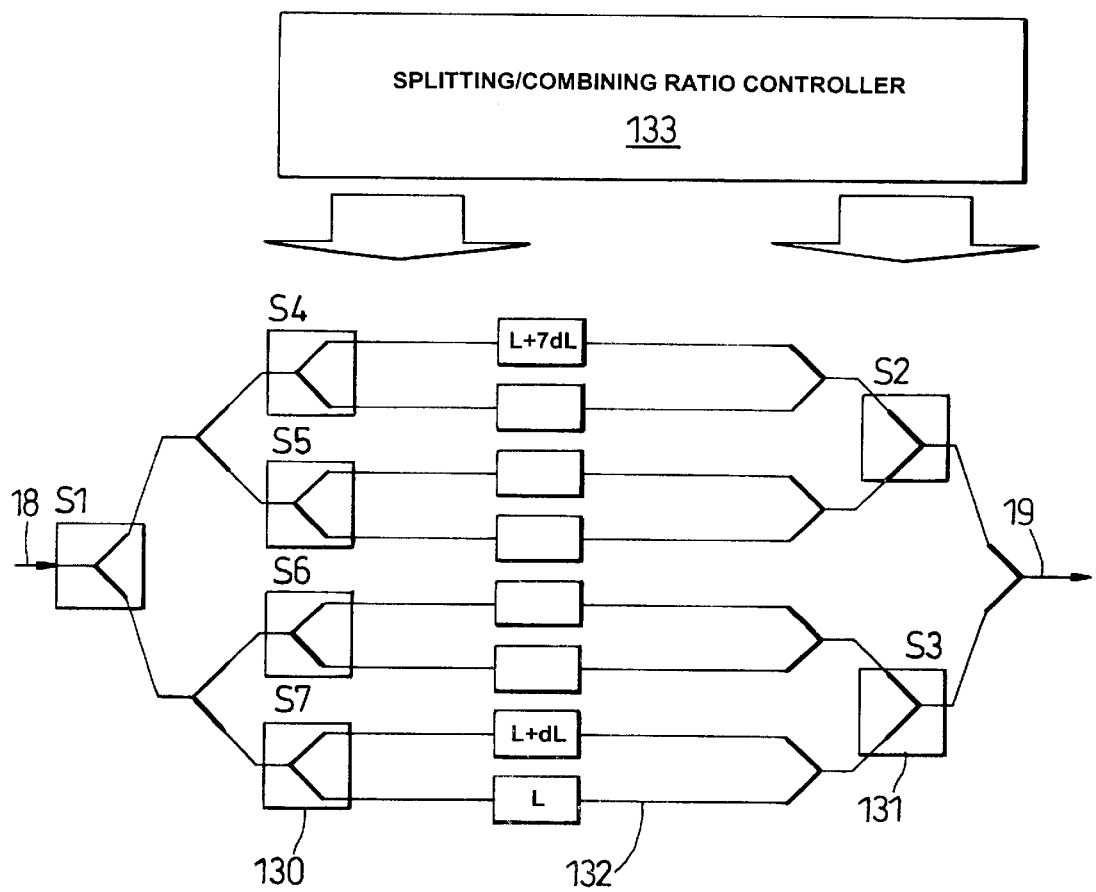
FIG. 13 is a schematic representation of a further alternative waveguide array equalizer with dynamically controlled Y splitters/combiners.

Alternative Waveguide Configuration of FIG. 13 Using Dynamically Controlled Y Junctions FIG. 13 illustrates schematically a further embodiment in which a multiple arm Mach-Zehnder interferometer includes controlled Y splitters 130 and Y couplers 131 which are operable to determine the proportion of input signal 18 directed through each of the arms 132 of the interferometer. The equalizer of FIG. 13 provides equalization for a WDM signal of 8 channels with 100 GHz frequency separation between channels. The difference in length between waveguides is 0.272 mm.

The proportion of the optical signal on each arm 132 is proportional to coupling coefficient $C_r$ with each of the coupling coefficients having zero phase (i.e. having a real value only).

As with the previous embodiment, the values of splitting ratios S1 to S7 provided by the splitters and couplers 130 and 131 are controlled electronically by a controller 133.

To calculate the coupling coefficients $C_r$, a set of values of $T_n$ for n=1 to 2N is generated in the same manner as described above with reference to the embodiment of FIG. 12. This ensures that the resulting coupling coefficients will be real by using the DCT method.

The phase of the complex values $T_n$ is then calculated via the Hilbert transform technique referred to above, thereby providing a set of $T_n$ for which the minimum phase condition is satisfied. Consequently, one half of the coupling coefficients will approximate to zero, thereby minimising the number of waveguides required to implement the equalizer.

A fast Fourier transform of $T_n$ is then calculated to obtain a set of values over which the first N terms are the $C_r$ coupling coefficients to be used in the equalizer.

As described above with reference to the embodiment of FIG. 12, the values of $C_r$ are adjusted by finding the smallest value and subtracting this from each of the values in order to minimise losses.

The splitting ratios S1 to S7 are then calculated from the $C_r$.

The values of $T_n$ may then be periodically updated using the arrangement of FIG. 1.

In the above described embodiments the lengths of waveguides forming the respective arrays are arranged with lengths which increase linearly between waveguides or subsets of waveguides of equal length. Alternative embodiments are possible in which this relationship is non-linear. It may in some circumstances be advantageous for the lengths to vary according to a square, cubic or exponential characteristic. The sequence of length increments may also be discontinuous.

The above described embodiments have also been described with reference to a Fourier Transform method of synthesis. Other methods may be possible such as standard multi-variable numerical optimization methods.

The described embodiments show an equalizer contained within a line amplifier. The equalizer may alternatively be a stand alone equalizer with dedicated input and output power monitoring circuits. Such equalizers may be incorporated into other optical elements such as routers, cross connect components or add-drop multiplexers.

Various alternative methods may be used for determining the power levels of input and output channels to the equalizer, such as for example, the use of an optical spectrum analyzer.

The equalizer input may be controlled in response to measurement by other systems, such as for example, a measurement of received power level, optical signal to noise, received bit error rate or eye quality.

The above embodiments employ a feedback loop in which measurement of the output is used to obtain a different signal applied to the input. Such feedback may be dispensed with, relying upon the input of a single equalizer setting as being sufficient adjustment.

The above embodiments have been described using various numbers of waveguides forming an array.

There is in theory no upper limit to the number of waveguides although there are practical limiting factors such as size and limitations due to manufacturing processes. The minimum number of waveguides is envisaged to be four although a typical equalizer may have between 8 and 32.

What is claimed is:

1. A method of applying equalization to an optical signal for use in an optical communications system, comprising steps of:
    splitting the optical signal into components having the same equalization characteristic as the optical signal;
    transmitting the components via respective waveguides of a waveguide array defining respective optical path lengths;
    variably setting at least one of (a) the relative amplitudes of and (b) the phases of the components transmitted via the waveguides; and
    combining the components transmitted by said waveguides to form an output optical signal whereby interference between said combining components applies equalization to the equalization characteristic of the output optical signal.

2. A method as claimed in claim 1 wherein said setting step is implemented in accordance with calculated values of parameters, the method including the step of calculating said parameters in accordance with a predetermined equalization characteristic.

3. A method as claimed in claim 2, including the steps of periodically measuring the output signal equalization characteristic, comparing the measured output signal equalization characteristic with a predetermined target equalization characteristic, calculating revised parameters for modifying the applied equalization characteristic to achieve an output signal equalization characteristic corresponding to the target equalization characteristic, and implementing the setting step in accordance with the revised values of the parameters.

4. A method as claimed in claim 2, wherein the optical signal is a wavelength division multiplexed optical signal defining N channels at respective N frequencies and wherein the parameters are calculated to define the applied equalization characteristic at said N frequencies.

5. A method as claimed in claim 4 including a step of representing said applied equalization characteristic by transfer function coefficients $T_n$, calculating a discrete fast Fourier transform of the transfer function coefficients $T_n$ to obtain coupling coefficients $C_r$, and calculating said parameters based on the values of said coupling coefficients $C_r$.

6. A method as claimed in claim 5 including the step of determining complex phase values of the transfer function coefficients $T_n$ by a Hilbert transform calculation conditional upon transformed coefficients obtained by the Fourier transform of $T_n$ having zero amplitude if they correspond to negative frequencies and calculating said parameters based on a reduced set of coupling coefficients $C_r$ selected to correspond to those transformed coefficients which are not made substantially equal to zero by virtue of the Hilbert transform calculation.

7. A method as claimed in claim 5 including the step of generating an expanded set of 2N transfer function coefficients $T_n$ by repeating the sequence of $T_n$ in reverse order, thereby obtaining as a result of the Fourier transform coupling coefficients $C_r$ which have real values and implementing the setting of the relative amplitudes of the components transmitted via the waveguides without variable setting of phase values.

8. A method as claimed in claim 5 wherein the setting of relative amplitudes of the components transmitted via the waveguides corresponds to parameters determined by amplitudes of the coupling coefficients and wherein the phases of the components are set according to parameters determined by the complex phase of the coupling coefficients.

9. A method as claimed in claim 5, wherein the setting of parameters in respect of each coupling coefficient is implemented by setting respective phase values for each of a respective sub-set of waveguides of substantially equal length, wherein said waveguide array comprises a plurality of said sub-sets whereby the waveguides of different sub-sets have mutually different lengths.

10. A method as claimed in claim 9, wherein the mutually different lengths associated with the plurality of sub-sets define a series of lengths increasing by equal length increments.

11. A method as claimed in claim 9 including a step of implementing the setting of respective phase values by localised heating of said waveguides to vary the optical path length.

12. A method as claimed in claim 9, wherein each sub-set comprises three waveguides respectively.

13. A method as claimed in claim 5 including the step of applying a bias characteristic $B_r(r)$ to the calculated coupling coefficients $C_r$.

14. A method as claimed in claim 13, wherein the bias characteristic $B_r(r)$ is such as to accentuate the amplitude of transmission in waveguides corresponding to low values of r.

15. A method as claimed in claim 2, wherein the setting of phase of each one of the components is implemented by actuation of heating elements operable to apply local heating to a respective portion of the waveguide.

16. A method as claimed in claim 2, wherein the setting of amplitude of the components is implemented by splitting the optical signal into components by means of Y couplings having a variable splitting ratio and controlling the splitting ratio by actuation of heating elements operable to apply local heating to portions of the waveguide.

17. An optical filter for applying equalization to an optical signal for use in an optical communications system, comprising:
    splitting means operable to split the optical signal into components having the same equalization characteristic as the optical signal;
    a waveguide array comprising a plurality of waveguides operable to transmit the components via respective waveguides of the waveguide array so as to define respective optical path lengths;
    setting means operable to variably set at least one of the relative amplitudes of and the phases of the components transmitted via the waveguides; and
    combining means operable to combine the components transmitted by said waveguides to form an output optical signal whereby interference between said combining components applies equalization to the equalization characteristic of the output optical signal.

18. A filter as claimed in claim 17 wherein said setting means is actuated in accordance with calculated values of parameters calculated in accordance with a predetermined equalization characteristic.

19. A filter as claimed in claim 18, including measuring means operable to periodically measure the output signal equalization characteristic, comparing means operable to compare the measured output signal equalization characteristic with a predetermined target equalization characteristic, calculating means operable to calculate revised parameters for modifying the applied equalization characteristic to achieve an output signal equalization characteristic corresponding to the target equalization characteristic, and wherein the setting means is actuated periodically in accordance with the revised values of the parameters.

20. A filter as claimed in claim 18, wherein the optical signal is a wavelength division multiplexed optical signal defining N channels at respective N frequencies and wherein the parameters are calculated to define the applied equalization characteristic at said N frequencies.

21. A filter as claimed in claim 20 wherein said calculating means represents said applied equalization characteristic by transfer function coefficients $T_n$, said calculating means being operable to calculate a discrete fast Fourier transform of the transfer function coefficients $T_n$ to obtain coupling coefficients $C_r$, and to calculate said parameters based on the values of said coupling coefficients $C_r$.

22. A filter as claimed in claim 21 wherein said calculating means is operable to determine complex phase values of the transfer function coefficients $T_n$, by a Hilbert transform calculation conditional upon transformed coefficients obtained by the Fourier transform of $T_n$ having zero amplitude if they correspond to negative frequencies and to calculate said parameters based on a reduced set of coupling coefficients $C_r$ selected to correspond to those transformed coefficients which are not made substantially equal to zero by virtue of the Hilbert transform calculation.

23. A filter as claimed in claim 21 wherein said calculating means is operable to generate an expanded set of 2N transfer function coefficients $T_n$ by repeating the sequence of $T_n$ in reverse order, thereby obtaining as a result of the Fourier transform coupling coefficients $C_r$ which have real values and wherein said setting means implements setting of the relative amplitudes of the components transmitted via the waveguides without variable setting of phase values.

24. A filter as claimed in claim 21 wherein the setting means is operable to set relative amplitudes of the components transmitted via the waveguides corresponding to parameters determined by amplitudes of the coupling coefficients and to set the phases of the components according to parameters determined by the complex phase of the coupling coefficients.

25. A filter as claimed in claim 21, wherein the setting means is operable to set parameters in respect of each coupling coefficient by setting phase values for each of a respective sub-set of waveguides of substantially equal length, wherein said waveguide array comprises a plurality of said sub-sets and whereby the waveguides of different sub-sets have mutually different lengths.

26. A filter as claimed in claim 25, wherein the mutually different lengths associated with the plurality of sub-sets define a series of lengths increasing by equal length increments.

27. A filter as claimed in claim 25 wherein the setting means comprises heating means operable to apply localised heating of said waveguides to vary the optical path length to thereby implement the setting of respective phase values.

28. A filter as claimed in claim 25, wherein each sub-set comprises three waveguides.

29. A filter as claimed in claim 21 wherein said calculating means is operable to apply a bias characteristic $B_r(r)$ to the calculated coupling coefficients $C_r$.

30. A filter as claimed in claim 29, wherein the bias characteristic $B_r(r)$ is such as to accentuate the amplitude of transmission in waveguides corresponding to the low values of r.

31. A filter as claimed in claim 18, wherein the setting means is operable to implement setting of phase of each one of the components by actuation of heating elements operable to apply local heating to a respective portion of the waveguide.

32. A filter as claimed in claim 18, wherein the setting means is operable to implement setting of amplitude of the components by splitting the optical signal into components by means of Y couplings having a variable splitting ratio and to control the splitting ratio by actuation of heating elements operable to apply local heating to portions of the waveguide.

33. A method of controlling an adaptive filter having a set of elements configured such that their combined effect determines an equalization characteristic of equalization applied by the filter; the method comprising the steps of:
actuating the elements according to values of a corresponding set of parameters;
calculating said parameters from complex values of control coefficients by a process which includes a discrete Fourier transform; and including the step of inputting values of amplitude for the control coefficients and calculating respective phase values of said coefficients by a Hilbert transform.

34. A method as claimed in claim 33 wherein the Fourier transform provides as its output a set of transformed coefficients which is greater in number than the set of parameters in respect of which elements are actuated, said parameters being selected to correspond to those transformed coefficients which are not made substantially equal to zero by virtue of the Hilbert transform.

35. A method as claimed in claim 33 wherein the filter is an optical filter for a wavelength division multiplexed optical signal and wherein the input values of amplitude are target values of equalization at signal carrying frequencies of the optical signal.

36. A method as claimed in claim 33 further comprising the step of determining values of amplitude for the control coefficients by comparing an output of the filter with target values of equalization to obtain difference values therebetween, and determining new values of the amplitudes of the control coefficients based on existing values thereof and said difference values.

37. An adaptive filter having a set of elements configured such that their combined effect determines an equalization characteristic of equalization applied by the filter, said filter comprising:
actuating means operable to actuate the elements according to values of a corresponding set of parameters;
calculating means operable to calculate said parameters from complex values of control coefficients by a process which includes a discrete Fourier transform;
determining means operable to determine values of amplitude for the control coefficients, and wherein the calculating means is operable to calculate respective phase values of said coefficients by a Hilbert transform.

38. A filter as claimed in claim 37 wherein said calculating means is operable to provide as the result of said Fourier transform a set of transformed coefficients which is greater in number than the set of parameters in respect of which elements are actuated, said parameters being selected to correspond to transformed coefficients which are not made substantially equal to zero by virtue of the Hilbert transform.

39. A filter as claimed in claim 37 wherein said filter comprises an optical filter for a wavelength division multiplexed optical signal and wherein the input values of amplitude are target values at signal carrying frequencies of the optical signal.

40. A filter as claimed in claim 37 wherein said determining means comprises means for comparing an output of the filter with target values to obtain difference values therebetween, wherein said determining means is operable to determine new values of the amplitudes of the control coefficients based on existing values thereof and said difference values.

41. A method of operating an optical filter to apply a desired equalization characteristic to a wavelength division multiplexed optical signal, the method comprising the steps of:

actuating a set of elements of the filter such that their combined effect determines an actual equalization characteristic applied to the optical signal, said elements being actuated according to values of a corresponding set of parameters;

calculating said parameters from control values determined in accordance with said desired equalization characteristic;

measuring an output of the filter and obtaining a measurement of the actual equalization characteristic;

comparing the measurement with the desired equalization characteristic to obtain difference values;

calculating new values of said control values based on said difference values and actuating said elements according to new parameters calculated from said new control values;

and periodically repeating said steps of measuring, actuating and calculating new values to apply an actual equalization characteristic substantially equal to said desired equalization characteristic.

42. An optical filter for applying a desired equalization characteristic to a wavelength division multiplexed optical signal, the filter comprising actuating means operable to actuate a set of elements of the filter such that their combined effect determines an actual equalization characteristic applied to the optical signal, said elements being actuated according to values of a corresponding set of parameters;

calculating means operable to calculate said parameters from control values and determining means operable to determine said control values in accordance with said desired equalization characteristic;

measuring means operable to measure an output of the filter and obtain a measurement of the actual equalization characteristic;

comparing means operable to compare the measurement with the desired equalization characteristic to obtain difference values;

wherein said calculating means is operable to calculate new values of said control values based on said difference values and said actuating means operable to actuate said elements according to new parameters calculated from said new control values;

and control means operable to periodically actuate said measuring means, actuating means and calculating means to operate said filter based on successive new control values and thereby apply an actual equalization characteristic substantially equal to said desired equalization characteristic.

* * * * *